United States Patent [19]

Roberts et al.

[11] Patent Number: 4,678,493
[45] Date of Patent: Jul. 7, 1987

[54] VITRIFICATION OF ASBESTOS WASTE

[75] Inventors: David Roberts; Henry S. Johnson, both of Sheffield, England

[73] Assignee: King Taudevin & Gregson (Holdings) Limited, Sheffield, England

[21] Appl. No.: 899,630

[22] Filed: Aug. 25, 1986

Related U.S. Application Data

[63] Continuation of Ser. No. 672,475, Nov. 16, 1984, abandoned.

[30] Foreign Application Priority Data

Nov. 21, 1983 [GB] United Kingdom ............... 8331031

[51] Int. Cl.⁴ .................. C03B 5/02; C03C 3/087
[52] U.S. Cl. ............................ 65/134; 65/27; 501/32; 501/155
[58] Field of Search .......... 501/27, 30, 32, 155; 65/27, 134, 346, 347, 339, 342; 252/629

[56] References Cited

U.S. PATENT DOCUMENTS

| | | | |
|---|---|---|---|
| Re. 15,727 | 12/1923 | Crossley | 65/18.1 X |
| 1,069,255 | 8/1913 | Heroult | 65/134 X |
| 2,531,612 | 11/1950 | Crochet et al. | 65/347 X |
| 3,161,600 | 12/1964 | Barton | 252/629 X |
| 3,161,601 | 12/1964 | Barton | 252/629 X |
| 3,232,731 | 2/1966 | Malicheff | 65/134 X |
| 3,499,743 | 3/1970 | Fanica et al. | 65/346 X |
| 3,907,956 | 9/1975 | Meunier | 65/134 X |
| 4,224,177 | 9/1980 | Macedo et al. | 252/629 |
| 4,225,332 | 9/1980 | Tsay | 65/134 |
| 4,441,906 | 4/1984 | Propster et al. | 65/27 |
| 4,468,473 | 8/1984 | Drolet et al. | 501/155 |

OTHER PUBLICATIONS

Stones & Cards in Glass Clark et al, pp. 63-64 Society of Glass Technology (No date available).

Primary Examiner—Robert Lindsay, Jr.
Attorney, Agent, or Firm—Shoemaker and Mattare, Ltd.

[57] ABSTRACT

Waste asbestos is converted into a glass by maintaining within an electrical glass melting furnace a body of molten glass at a temperature above the decomposition temperature of asbestos; supplying asbestos to the furnace; and withdrawing molten glass from the furnace at a temperature of at least 1000° C. The asbestos is advantageously mixed with cullet and a melt accelerator and fed into the furnace by means of a screw mixer/conveyor. The furnace is advantageously operated at a pressure less than atmospheric pressure.

11 Claims, 3 Drawing Figures

VITRIFICATION OF ASBESTOS WASTE

This application is a continuation of application serial No. 672,475, filed 11/16/84 now abandoned.

FIELD OF THE INVENTION

The present invention relates to a process for vitrifying waste asbestos.

BACKGROUND TO THE INVENTION

Asbestos is a range of complex silicates. It is an extremely refractory material and is widely used for high temperature insulation. It is not thought to be an easy material to convert into a glass, indeed asbestos entering a glass furnace accidentally has been known to produce solid inclusions in the finished glass. But since asbestos is a toxic material some means of converting waste asbestos into an inert substance is required.

The use of inter alia asbestos in glass manufacture was proposed by Crossley in U.S. No. Re. 15727 of U.S. Pat. No. 1,394,973. He proposed to heat vitreous material and mica or asbestos to a temperature above the melting point of the glass but below the decomposition temperature of the asbestos so that the physical and chemical characteristics of the mica or asbestos were preserved, and temperatures of 650°-900° C. were employed. But insofar as the asbestos was not destroyed and did not become part of the glass matrix, it retained its toxic properties, and glass derived from asbestos according to Crossley's process would not now be regarded as safe to discharge on a waste tip. The vitrification of asbestos was also taught by Santt in French patent specification No. 2398704 but he considered incorrectly that asbestos is destroyed at temperatures above 600° C. and relied on complex iron-containing mixtures to form a glass or frit.

SUMMARY OF THE INVENTION

This invention is based on the discovery that asbestos can be converted into a non-toxic glass in an enclosed processing system where there is a minimal risk of asbestos being released to the atmosphere.

The present invention provides a process for converting waste asbestos into a glass which comprises maintaining within an electrical glass melting furnace a body of molten glass at a temperature above the decomposition temperature of asbestos; supplying asbestos to the furnace; and withdrawing molten glass from the furnace at a temperature of at least 1000° C.

The process described above has the advantage that it can be operated continuously. Furthermore the bulk of the glass product is far less than that of the waste asbestos, so that disposal is a greatly reduced problem.

The asbestos that can be processed according to the invention includes the principal forms Chrysotile, Amosite and Crocidolite as well as asbestos containing materials such as asbestos-cement materials used e.g. as roofing and constructional materials.

Under normal circumstances, if a large quantity of asbestos were added to a glass melting furnace only a small proportion would dissolve in the glass. The result would be a glassy matrix containing unconverted and partly converted asbestos residues. When the glass was subsequently cooled and broken up, asbestos surfaces would be exposed, with the attendant risks of asbestos dust.

DESCRIPTION OF THE PREFERRED FEATURES

We have found in laboratory scale melting tests that by combining the asbestos with cullet (waste glass) and as little as 10% by weight NaOH as melt accelerator, in solution in water, the asbestos will dissolve completely producing a well refined and homogeneous glass. Trials have shown that melting to a glass can be accomplished in less than 1 hour at 1250° C. In pilot plant melting trials using a furnace having a 0.5 tons/day capacity it was found that lesser amounts of sodium hydroxide, e.g. 0.5–5% by weight and preferably 0.5–2% by weight would adequately accelerate melting and reduce melt temperature and power consumption.

The melt accelerator may in general be an alkali metal compound, an alkaline earth metal compound, a boron compound, a fluoride or chloride or a slag such as blast furnace slag. It is believed that potassium hydroxide is an effective melt accelerator, as may be a suspension of an alkaline earth metal hydroxide such as calcium hydroxide. Carbonates may be employed but are not preferred because they increase the volume of gas evolved and hence need more elaborate air filtration systems. And for the same reason melting in an electric furnace is used instead of other kinds of glass melting furnaces such as top fired gas furnaces.

The use of cullet in admixture with the asbestos is preferred because it effectively dissolves and decomposes the asbestos and is low melting. But the asbestos can be mixed with glass-making materials such as soda ash, sand and limestone subject to somewhat higher furnace operating temperatures. Up to 80% by weight of the material fed may be asbestos, the balance being cullet and melt accelerator.

If desired a source of fluoride ions such as sodium, potassium or calcium fluorides may be incorporated into the mixture to provide a more aggressive dissolving medium for the asbestos and to reduce melt viscosity, thereby giving better mass transfer properties.

For convenience in handling and the least impact on the environment, the asbestos should be maintained in a sealed environment once it has been brought to the furnace. Thus the asbestos and cullet or glass-making material are preferably conveyed to the furnace by sealed mixing and conveying means. Thus asbestos from an asbestos hopper together with material from a cullet or glass-making material hopper are fed directly into a screw conveyor together with any melt accelerator, the screw conveyor in turn leading direct into the furnace.

The furnace and feed system are preferably operated at reduced pressure to minimise emission of asbestos to the environment. In this respect the invention differs from normal glass-making practice where the furnace is operated at a slight positive pressure to minimise inflow of cold air.

It has further been appreciated that a plant for carrying out the asbestos vitrifying process aforesaid might be provided in portable form. In this way the plant can be transported to a site such as a factory or power station where there was asbestos to be disposed of and the treatment can be carried out without the asbestos being transported from the site which is an operation that inevitably involves risk to the general public. Suitable transportable furnaces might have a capacity up to 10 tons per day.

If the furnace is electrically fired, it is believed that many sites will have sufficient three phase electrial power to run the furnace.

DETAILED DESCRIPTION OF PREFERRED EMBODIMENT

Figure 1:
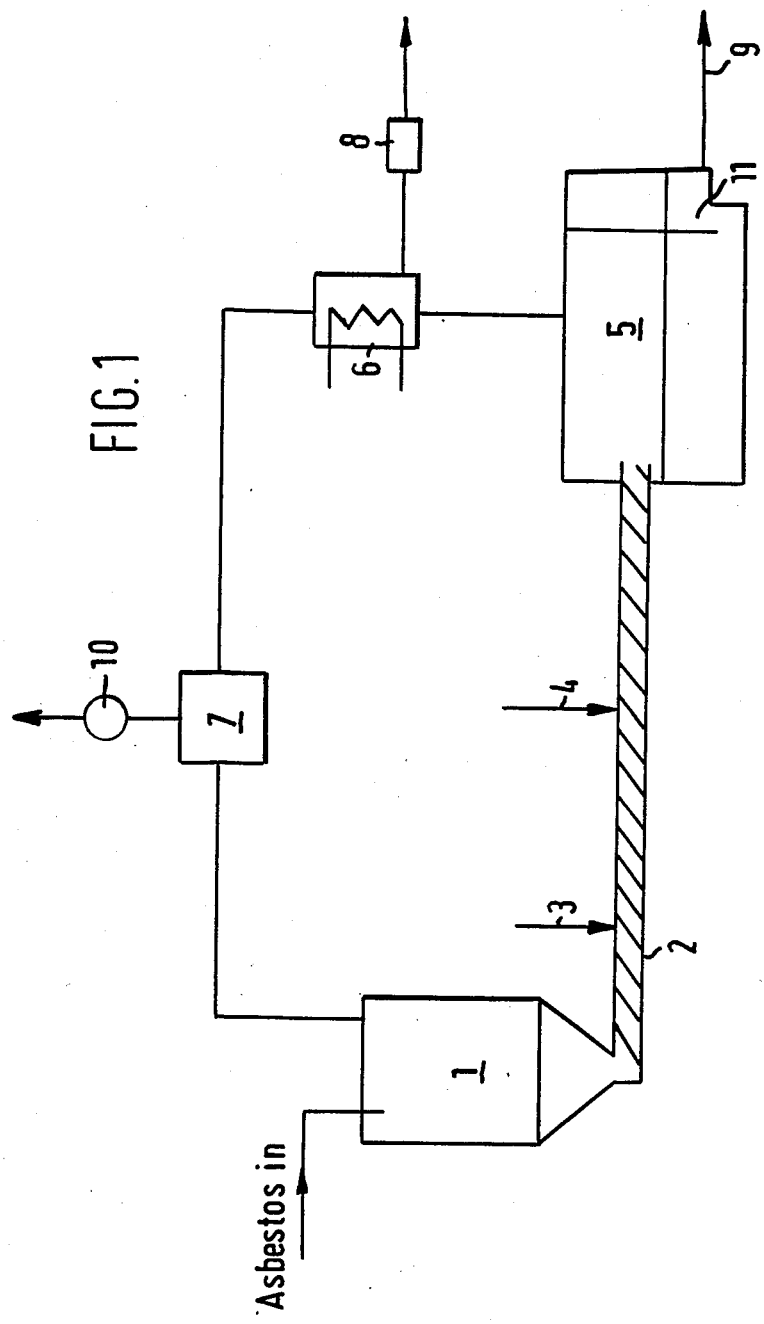
FIG. 1 is a schematic flow chart for the process of the invention.

Once the asbestos has been received it is first pulverised if necessary to a size small enough to permit rapid melting and then kept in a totally enclosed storage hopper 1 maintained under reduced pressure to prevent any asbestos particles escaping to the atmosphere. The waste asbestos from hopper 1 is discharged along a screw conveyor/mixer 2 and aqueous sodium hydroxide is introduded at 3 and is intimately mixed with the asbestos. Complete coating of the asbestos with sodium hydroxide gives two advantages. Firstly, in wetting the asbestos it eliminates the possibility of dust being released after that point and secondly is an important aid in the rapid incorporation of the asbestos into the glass. Cullet (waste glass) is added at 4 and is mixed with the asbestos/sodium hydroxide mixture. The resultant material is introduced to an electric furnace 5 in which a body of molten glass is maintained at above the decomposition temperature of asbestos (900° C.) and preferably at 1350°-1380° C. corresponding to a temperature of about 1250° C. at the top of the molten glass. Any entrained air, and the water released from the sodium hydroxide solution is vented from the furnace. If necessary, water may be condensed by a condenser 6 filtered in filter 8 and discarded. But if the gases leaving the furnace 5 have a sufficiently high dew point water will not condense and the condenser 6 may be omitted. The small amount of air is discharged via an efficient filter 7 to atmosphere via a fan 10 that maintains a reduced pressure. It is an advantage of using sodium hydroxide as opposed to sodium carbonate that the volume 15 of gas evolved during melting is small so that the filtration system can be relatively inexpensive. In normal glass making a large quantity of gas is evolved, in addition large quantities of combustion products are released when fossil fuel firing is used. The glass which is produced 9 can either be quenched and disposed of as a safe non-toxic waste, or it could form a process feed stock for forming into a variety of glass products such as fibre insulation, ballotini, blocks, bottles, vitreous enamels and ceramic tiles. The use of an electrical furnace according to the invention gives an intrinsically safe process because if the glass temperature at the throat region 11 of the furnace falls below 1000° C. the glass becomes so viscous that it will not flow whereas asbestos is destroyed by heating to temperatures above 900°. It follows therefore that no asbestos can leave the furnace 5 untreated.

Glass from the furnace 5 flows to an electrically top-heated take-off 12 from which a product stream 13 of homogeneous molten glass is bottom-discharged into a water quench tank 14 from which the resulting cullet is conveyed by belt conveyor 15 to a disposal skip 16. Water quenching has the advantage that the widest possible range of product streams are maintained as homogeneous glasses. The product stream could be alternatively quenched by means of a water jet and propelled to a conveyor or other suitable disposal device.

The use of caustic soda and electric melting mean that with the exception of a very small amount of entrained air, the only gas released is steam which normally does not condense to water. If however water condenses, it can be easily and safely filtered. The process therefore results in products that are easy to disposed of from an environmental standpoint.

The invention will now be further described with reference to the following examples in which Example I describes laboratory batch melting trials and Example II is an example of the invention.

EXAMPLE I

Figure 3:
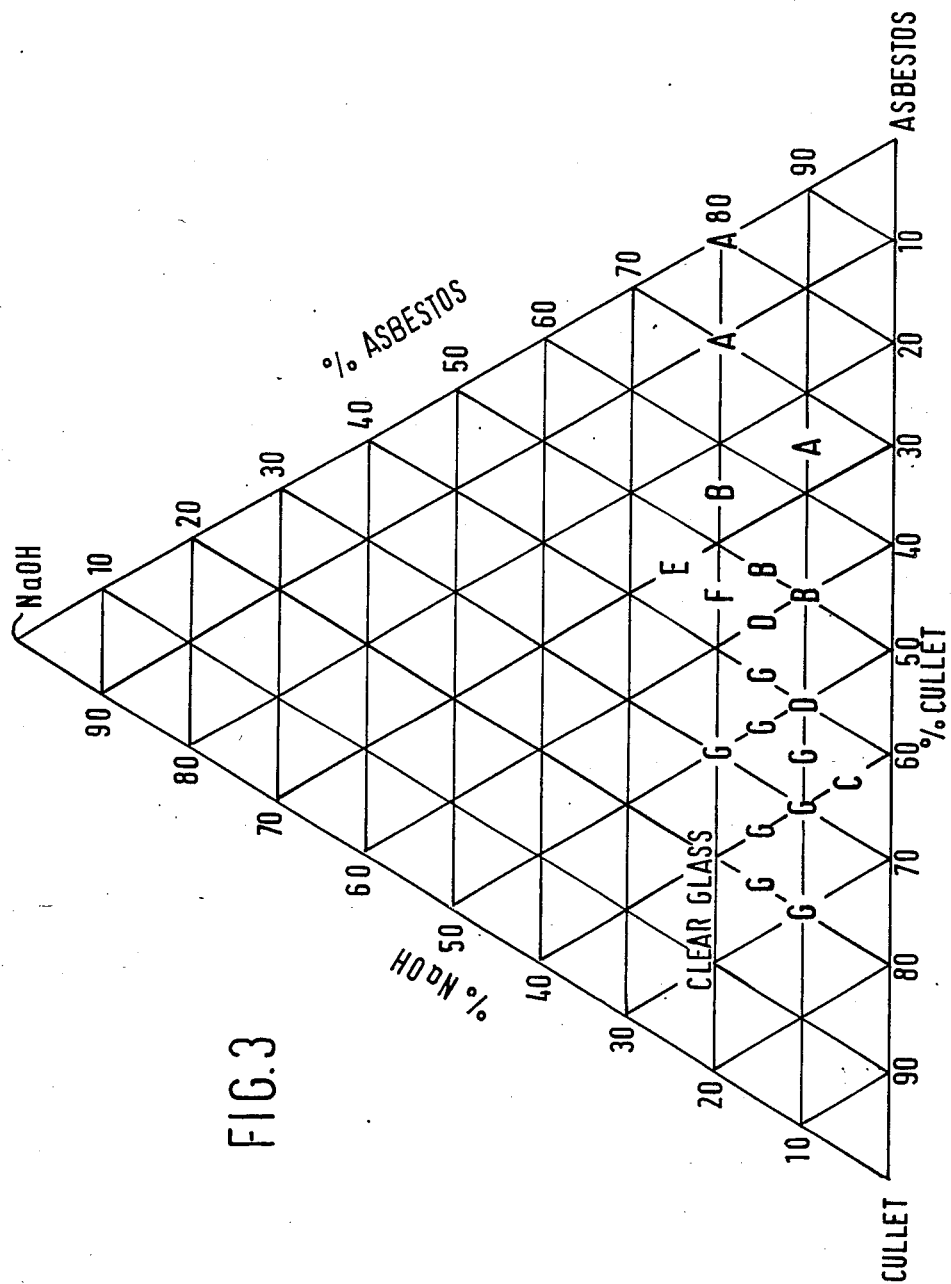
FIG. 3 is a graphic representation of the results of a laboratory batch melting trial.

Asbestos string which was assumed to be pure white asbestos was cut into 10-20 mm lengths which were separated into individual strands about 1-2 mm in diameter. White flint glass cullet was crushed to a particle size less than 5 mm. Laboratory grade sodium hydroxide was made up into aqueous solutions one containing 40 g/100 ml and the other containing 20 g/100 ml. Batches to be melted were made up as follows. Asbestos was weighed into a platinum alloy crucible and the appropriate amounts of the or each sodium hydroxide solution were pipetted onto the asbestos as evenly as possible. Where the solution wetted only a small amount of the asbestos, the asbestos was mixed around, after which the mixture of asbestos and sodium hydroxide was pressed down in the crucible and the cullet weighed onto it to form an even layer. The cullet was the uppermost layer because it had a higher bulk density than the asbestos/sodium hydroxide mixture which was packed firmly because these conditions were found to be the most favourable to small-scale melting. Each batch was of total weight 20 g and was heated at 1250° C. for 60 minutes. The compositions of the 20 batches used are shown in Table 1, the results obtained are shown in Table 2 and illustrated graphically in FIG. 3.

TABLE 1

| | Batch compositions | | | | | | |
|---|---|---|---|---|---|---|---|
| | Batch-percent composition | | | Batch used | | | |
| Batch No. | Asbestos | Caustic Soda | Cullet | Asbestos (g) | Cullet (g) | Caustic Soda Soln. (ml) | |
| | | | | | | 40 g/100 ml | 20 g/100 ml |
| 1 | 80 | 20 | — | 16 | — | 10 | — |
| 2 | 70 | 20 | 10 | 14 | 2 | 10 | — |
| 3 | 65 | 10 | 25 | 13 | 5 | 5 | — |
| 4 | 55 | 20 | 25 | 11 | 5 | 10 | — |
| 5 | 50 | 20 | 30 | 10 | 6 | 10 | — |
| 6 | 50 | 15 | 35 | 10 | 7 | 5 | 5 |
| 7 | 50 | 10 | 40 | 10 | 8 | 5 | — |
| 8 | 45 | 25 | 30 | 9 | 6 | 10 | 5 |

TABLE 1-continued

| Batch No. | Batch-percent composition | | | Batch used | | Caustic Soda Soln. (ml) | |
|---|---|---|---|---|---|---|---|
| | Asbestos | Caustic Soda | Cullet | Asbestos (g) | Cullet (g) | 40 g/100 ml | 20 g/100 ml |
| 9 | 45 | 20 | 35 | 9 | 7 | 10 | — |
| 10 | 45 | 15 | 40 | 9 | 8 | 5 | 5 |
| 11 | 40 | 20 | 40 | 8 | 8 | 10 | — |
| 12 | 40 | 15 | 35 | 8 | 7 | 5 | 5 |
| 13 | 40 | 10 | 50 | 8 | 10 | 5 | — |
| 14 | 35 | 15 | 50 | 7 | 10 | 5 | 5 |
| 15 | 35 | 10 | 55 | 7 | 11 | 5 | — |
| 16 | 35 | 5 | 60 | 7 | 12 | — | 5 |
| 17 | 30 | 20 | 50 | 6 | 10 | 10 | — |
| 18 | 30 | 10 | 60 | 6 | 12 | 5 | — |
| 19 | 25 | 15 | 60 | 5 | 12 | 5 | 5 |
| 20 | 20 | 15 | 65 | 4 | 11 | 5 | 5 |
| 21 | 20 | 10 | 70 | 4 | 14 | 5 | — |

TABLE 2
Results of all trials

| Batch No. | Result | Reference in FIG. 1 |
|---|---|---|
| 1,2,3 | Completely unsatisfactory. Partial fusion to an inhomogeneous, buff-coloured mass containing incompletely dissolved asbestos. | A |
| 4,5,6,7 | Fairly large areas of 'crust' on glass surface. Undissolved material in body of glass. Also significant amount of glass formation. Might possibly form a glass with more time and perhaps stirring. | B |
| 16 | Considerable amount of undissolved material, apparently due to high glass viscosity. | C |
| 10,13 | Very small amount of surface 'scum' but fairly large amounts of incompletely dissolved material in glass bulk. Looks as though it would probabaly melt completely with more time and/or stirring. | D |
| 8 | Completely fused but appears to have devitrified. | E |
| 9 | Very close to clear glass formation but fairly large amount of 'cloudy' material in glass body. Would almost certainly form a clear glass with more time or stirring. | F |
| 11,12,14, 15,17,18, 19,20,21 | Clear glass. | G |

It was found that provided an appropriate ratio between asbestos, caustic soda and cullet was selected a clear glass can be obtained in laboratory melting trials and it was postulated that large scale melting of batches of material of similar composition would be likely to be a practical proposition because the melting process becomes more reliable and controllable as batch size increases.

EXAMPLE II

Figure 2:
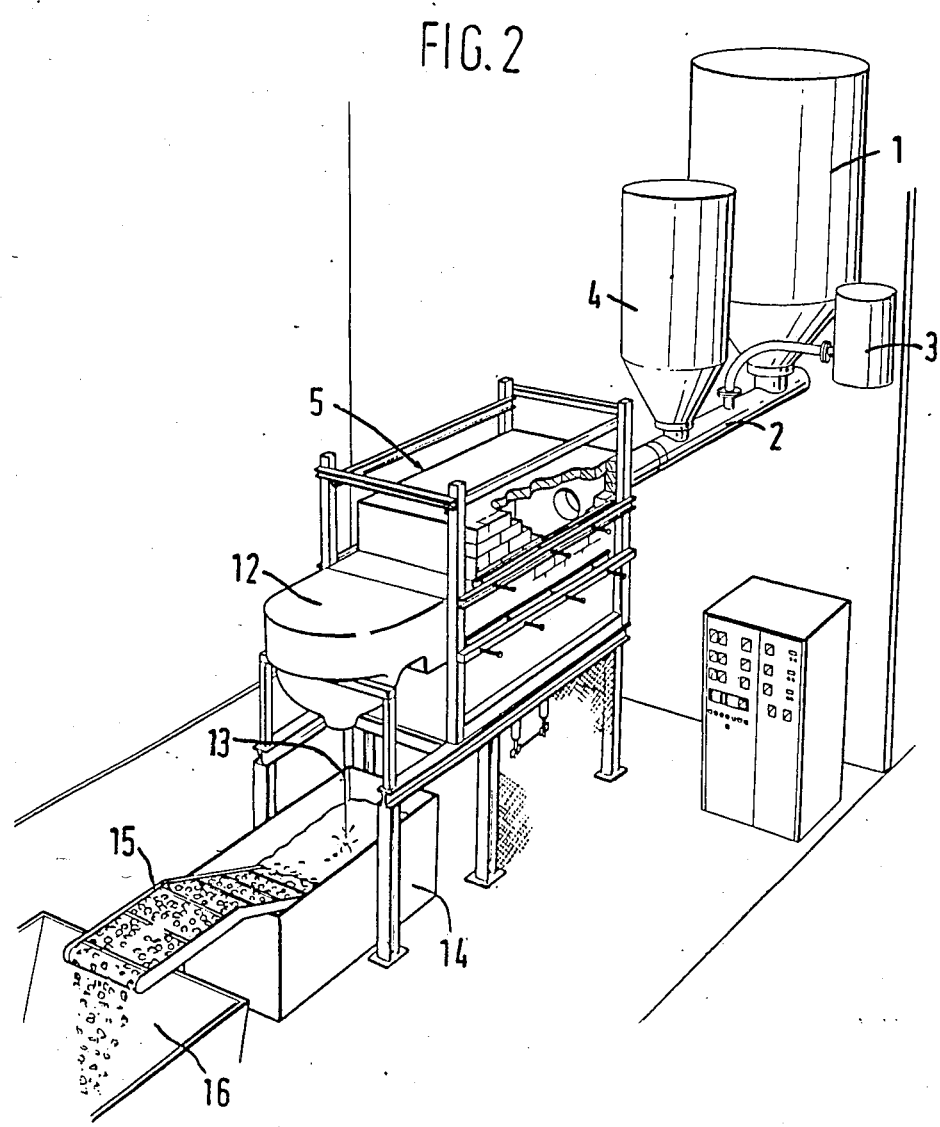
FIG. 2 is a sketch of a practical furnace installation according to the invention.

A pilot plant installation of capacity 0.5 tons/day was set up as illustrated in FIGS. 1 and 2 and the furnace 5 was charged with cullet which was melted. The following supply streams were fed to the furnace with change-over at approximately daily intervals:

TABLE 3

| Trial No. | % Composition | | | Product Stream |
|---|---|---|---|---|
| | Asbestos | Cullet | NaOH | |
| A | 46.3 | 49.2 | 4.5 | Completely molten glass |
| B | 56.4 | 40.7 | 2.9 | " |
| C | 65.7 | 32.9 | 1.4 | " |
| D | 75.2 | 24.1 | 0.7 | " |
| E | 75.8 | 24.2 | Nil | " |
| F | 70.0 | 30.0 | Nil | " |
| G | 100 | Nil | Nil | Glassy material at reduced melting rate |

The above trial indicated that asbestos can be converted into a completely molten material by means of a continuous electric melter using cullet only, the asbestos being free of the impurities encountered in normal waste asbestos. The presence of melt accelerator was considered desirable in practical use of the process to bring about digestion of non-asbestos materials and to accelerate melting.

We claim:

1. A process for converting waste asbestos into a vitreous glass product which comprises the steps of:
   providing an electrical glass melting furnace having two regions, a first region of said regions defining a closed melting chamber including means for feeding asbestos into the melting chamber and means for permitting the molten glass melt formed in said melting chamber to flow from said first region to a second region in said furnace comprising means in said furnace located between said first region and said second region for separating the furnace into said two regions capable of containing molten glass at a temperature of at least 1000° C., said two regions communicating with each other below the level of said melt;
   supplying asbestos and a source of glass into said first region of said furnace;
   heating said asbestos and said source of glass to form a melt;
   maintaining said melt at less than atmospheric pressure, and a temperature of at least 1000° C. for a sufficient period of time to decompose the asbestos;
   withdrawing the melt from said second region of the furnace at a preselected temperature of at least 1000° C. by permitting the melt to continuously flow from said first region maintained at a reduced pressure to said second region from which it is withdrawn by discharge from the said second region at atmospheric pressure;
   said flow between said first and second regions being confined to flow of the melt below the surface of the melt, whereby during continuous operation of said process the restricted flow of said melt between the two regions of said furnace can occur while maintaining less than atmospheric pressure above said first region and while withdrawing a homogeneous melt from said second region containing substantially no undecomposed asbestos.

2. A process according to claim 1, wherein the asbestos is mixed with cullet before it is fed into the furnace.

3. A process according to claim 1 wherein the asbestos is mixed with glass-making materials before it is fed into the furnace.

4. A process according to claim 2, wherein the asbestos is fed into the furnace by sealed mixing and conveying means.

5. A process according to claim 4 wherein an asbestos waste hopper and a cullet or glass-making materials hopper feed into a screw conveyor leading to the furnace.

6. A process according to claims 2, wherein the material supplied to the furnace further comprises a melt accelerator.

7. A process according to claim 6 wherein the melt accelerator is an alkali metal compound, an alkaline earth metal compound, a boron compound, a flouride or chloride or a blast furnace slag.

8. A process according to claim 7, wherein the melt accelerator comprises sodium hydroxide.

9. A process according to claim 8, wherein the material fed to the glass melting furnace comprises 20–80%, by weight asbestos, 80–20% cullet and 0.5–5% sodium hydroxide.

10. A process according to claim 1, wherein the furnace is maintained at a temperature of 1350°–1380° C. and the residence time of the asbestos is at least 1 hour.

11. A process according to claim 1, wherein a stream of glass discharged from the furnace is quenched by passage into a bath of water.

* * * * *